United States Patent
Long et al.

(10) Patent No.: US 6,685,771 B2
(45) Date of Patent: Feb. 3, 2004

(54) INTRODUCING AN ADDITIVE TO PORTLAND CEMENT

(76) Inventors: David Long, 1812 Conejo La., Fullerton, CA (US) 92633; Lorraine Segala, 1812 Conejo La., Fullerton, CA (US) 92633

(*) Notice: Subject to any disclaimer, the term of this patent is extended or adjusted under 35 U.S.C. 154(b) by 0 days.

(21) Appl. No.: 10/074,567

(22) Filed: Feb. 11, 2002

(65) Prior Publication Data

US 2002/0117089 A1 Aug. 29, 2002

Related U.S. Application Data

(60) Provisional application No. 60/272,168, filed on Feb. 27, 2001.

(51) Int. Cl.$^7$ .................................................. C04B 7/36
(52) U.S. Cl. ........................ 106/407; 106/745; 588/257
(58) Field of Search ................................ 106/407, 745; 588/257

(56) References Cited

U.S. PATENT DOCUMENTS

| | | | |
|---|---|---|---|
| 4,081,285 A | 3/1978 | Pennell | 106/100 |
| 4,249,952 A | * 2/1981 | Davis, Jr. et al. | |
| 5,496,404 A | 3/1996 | Price et al. | 106/407 |
| 5,614,016 A | 3/1997 | Hundebol | 106/745 |
| 5,837,052 A | 11/1998 | Oates et al. | 106/705 |
| 5,853,474 A | * 12/1998 | Hilton | 106/697 |
| 6,162,164 A | 12/2000 | Lorraine et al. | 588/257 |

* cited by examiner

*Primary Examiner*—Paul Marcantoni
(74) *Attorney, Agent, or Firm*—Rutan & Tucker; David Zoetewey

(57) ABSTRACT

The present invention provides methods and systems of incorporating a mineral based particulate into Portland cement including agglomerating a particulate material and an agglomerating material to produce an additive, introducing the additive into a raw feed before burning the raw feed. By introducing the additive before burning, minerals are added to cement clinker.

16 Claims, 3 Drawing Sheets

INTRODUCING AN ADDITIVE TO PORTLAND CEMENT

This application claims the benefit of U.S. provisional application No. 60/272,168 filed on Feb. 27, 2001 incorporated herein by reference in its entirety.

FIELD OF THE INVENTION

The field of the invention is waste recycling.

BACKGROUND OF THE INVENTION

The amount of waste in the world is a big problem, and contributing significantly to the problem are wastes that are created as by-products of industrial processes. Methods for disposing of these wastes are often expensive and environmentally disfavored, particularly when the waste is hazardous. Disposal of hazardous waste is expensive, at least in part because special care in shipping and collection is required, specially designed storage tanks may be necessary, and hazardous wastes are disposed of in specifically permitted facilities. While it may be less expensive to dispose of non-hazardous waste, the concept of disposal is not favored because of its negative environmental impact.

In order to solve some of the above-enumerated problems, waste products may be recycled. Of course, recycling eliminates the cost of disposal to the extent that the waste is used, but recycling may turn out to be more expensive than disposal, because of the expenses to accumulate, pack, and ship the waste products. This is particularly true with respect to finely ground or particulate waste which is especially difficult to accumulate, pack, and use in another product. Additionally, finding entities to purchase some types of waste as well as some waste derived recycled products may prove to be difficult and time consuming, because of lack of demand for the product. Often times it is easier, albeit less favored, to simply dispose of the waste. Therefore, it is important to find additional financially feasible uses for waste products and waste-derived recycled products.

A use for recycled waste paint is disclosed in U.S. Pat. No. 5,496,404 to Price and Long (March 1996). The '404 patent teaches that waste paint can be used in the manufacture of Portland cement. The waste paint is added to the process after burning the raw materials. During the burning process, the raw materials become chemically attached and partially fused forming lumps of cement clinker. These lumps are usually finely ground to form Portland cement, and it is during this grinding step that the '404 patent contemplates addition of the waste materials. In this case, the mineral content of the waste may provide benefit to the Portland cement. A limitation with respect to adding the waste during the grinding is that only a small number of materials are usable at this point. The usable materials are generally limited to high calcium/low silica materials.

Another use for waste materials in the manufacture of Portland cement involves using high fuel value wastes to contribute heat to the burning process. During the manufacturing process for Portland cement, raw materials are usually burned within a kiln. The burning process may be calcining, roasting, autoclaving or some other process, but in any case, the process is generally performed at about 2600 degrees Fahrenheit. U.S. Pat. No. 4,081,285 to Pennel (March 1978) teaches that high fuel value waste such as oil based paint may be burned outside of the kiln as an aid to reaching the required temperature. Still, there is a need to find other uses for wastes, especially those that do not contribute significant fuel value.

One such use is as an agglomerating agent to bond particulates. U.S. Pat. No. 6,162,164 to Long and Segala (December 2000) addresses the expenses and issues associated with the handling and use of particulates. Particulates are those materials that have very small particles. For example, fly ash, cinder fines, shale fines, and fine silica sand. While these products may have value in the production of other products, recycling them was often not feasible because of the cost involved in handling, packing, and using them. The '164 patent teaches agglomeration. It is presumably much easier to manage the agglomerated product, and therefore the costs of handling, packing, and using the waste is reduced. However, problems related to finding uses for the agglomerated material remain.

Thus, there is a long-standing need to find cost effective uses for agglomerated low fuel value waste material, particularly in Portland cement.

SUMMARY OF THE INVENTION

The present invention provides methods and systems of incorporating a mineral based particulate into Portland cement. The method and systems include agglomerating a particulate material and an agglomerating material to produce an additive. The additive is introduced into a kiln before burning. By introducing the additive before burning, minerals may be added to cement clinker.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
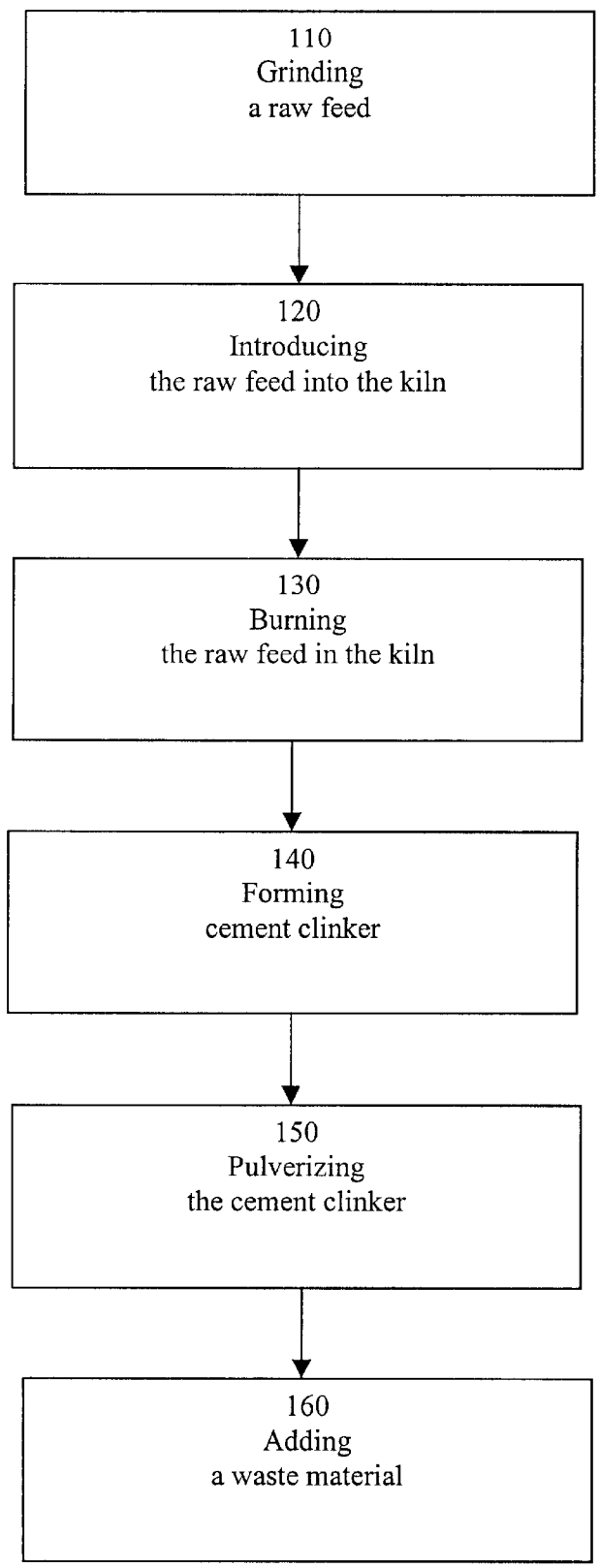
FIG. 1 is a schematic of a prior art method of utilizing waste in the manufacture of Portland cement after the burning process.

Referring first to FIG. 1, a prior art method of utilizing a waste in the manufacture of Portland cement includes grinding a raw feed 110, introducing the raw feed into the kiln 120, burning the raw feed in the kiln 130, forming cement clinker 140, pulverizing the cement clinker 150, and adding a waste material 160.

Significantly, in this prior art method, the waste material is introduced in step 150 which is after the burning step 130. The main benefit from the process depicted in FIG. 1 is the addition of a waste material to the Portland cement. It is important to note that the cement clinker is formed prior to the addition of the waste material, therefore, the waste product does not become part of the cement clinker. Additionally, since the waste material is not exposed to the burning process (i.e. calcining), there is no apparent loss or change in the waste material due to the process, for example due to burning of orgainics.

Figure 2:
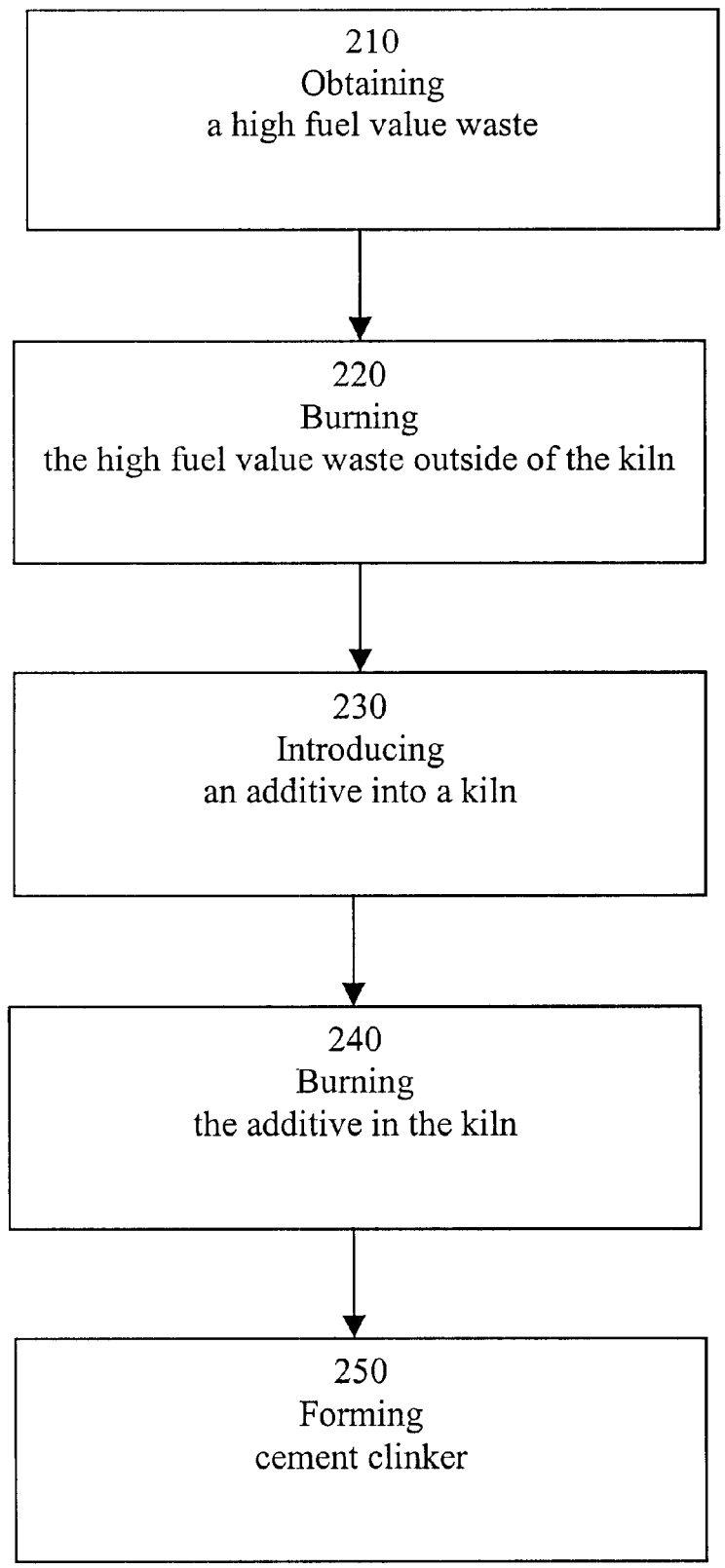
FIG. 2 is a schematic of a prior art method of utilizing waste in the manufacture of Portland cement before the burning process.

FIG. 2 depicts a prior art method in which the waste material is introduced before the burning step. The method of FIG. 2 generally includes obtaining a high fuel value waste 210, burning the high fuel value waste outside of the kiln 220, introducing an additive into the kiln, 230, and burning the additive 240 thereby forming cement clinker 250.

The significance of FIG. 2 is that a high fuel value waste is burned outside of the kiln, and the heat generated by the burning is utilized to heat the kiln.

Figure 3:
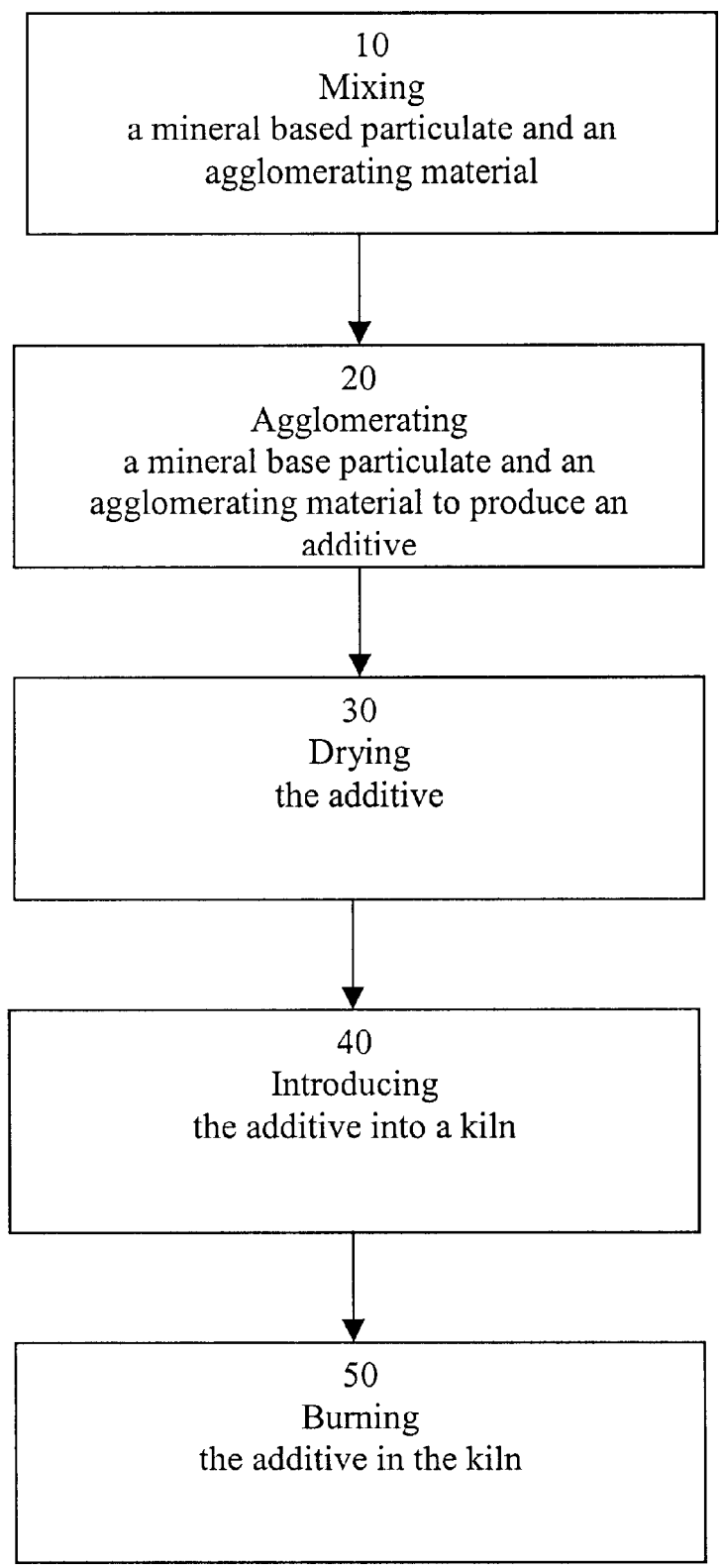
FIG. 3 is a schematic of a method of utilizing waste in the manufacture of Portland cement

In FIG. 3 a method of recycling waste in the manufacture of Portland cement includes mixing a mineral based particulate and an agglomerating material 310, agglomerating a mineral base particulate and an agglomerating material to produce an additive 320, drying the additive 330, introducing the additive into a kiln 340, and burning the additive in the kiln 350.

A particulate is defined herein as a plurality of separate particles that each are no larger than 10 mm in size It is contemplated that a mineral based particulate may include at least one of the following: lime kiln dust, cement kiln dust, combustion ash, diatomaceous earth, perlite, slag fines, aluminum dross fines, pyrite ash, tailings from mineral extraction, cracking catalyst fines, iron ore fines, fly ash, baghouse fines, and powder coating dust.

A mineral based particulate that is used in the methods described herein is typically derived from waste (i.e. an unneeded by-product of a process), but this should not be construed as a limitation because the mineral based particulate may not be a waste. Supply of a mineral based particulate is preferably obtained from at least one of a coal fired furnace, a cement kiln, a lime kiln, and a power plant that burns coal.

In a preferred class of embodiments, an agglomerating material is a paint waste comprised of pigments, limestone, silica, iron oxide, titanium oxide, barium oxide, film forming resins, preservatives. Of course, an agglomerating material is not necessarily a paint waste or even a waste product at all. Other suitable agglomerating materials include water soluble paint, water soluble ink, paint wash water, resists and adhesives. A characteristic of an agglomerating material is that it can bind or agglomerate a mineral based particulate sufficiently so that it is feasible for such a particulate to be used in a cement manufacturing process. Agglomerating material may be obtained from any appropriate source, and a particularly preferred source includes a waterfall paint booth.

Mixing of a mineral based particulate and an agglomerating material 310 is generally accomplished with a mixing apparatus such as a pug mill or drum mixer. The step of agglomerating a mineral based particulate and an agglomerating material 320 typically occurs during mixing, and produces an additive having a consistency of a semi-solid to a solid, though other consistencies are contemplated including even a liquid. An additive is preferably a low fuel value additive which is defined herein as having a b.t.u./lb rating of less than 5000. Other embodiments may include an additive that has a b.t.u./lb rating of greater than 5000, including up to 10000. In a preferred embodiment, 5 parts of agglomerating material(s) are combined with 1–15 parts of a mineral based particulate(s). Other embodiments include reasonable variants including a ratio by weight of between 1:0.5 and 1:5—agglomerating material to mineral based particulate.

The step of drying the additive 330 may be accomplished simply by exposing the additive to ambient air. Drying may include preheating or pre-calcining an additive before introduction into a kiln. It should be appreciated, however, that drying of the additive 330 may not be advantageous.

Introducing, as used in "introducing the additive" into the kiln 340, is defined as adding or otherwise putting the additive into the kiln. Typically a raw feed comprised substantially of calcium, silica, aluminum, and iron will also be added to the kiln. The additive and raw feed may then burned in the kiln. The burning step 350 preferably comprising calcining, roasting, or autoclaving all of which include heating a kiln to approximately 2600° F., and forming cement clinker.

During the burning step 350, the additive is exposed to extreme heat. Unlike the prior art methods of FIGS. 1 and 2, organics are burned in the kiln and minerals from both the mineral based particulate and agglomerating material become part of the cement clinker. The resulting clinker will have relatively more mineral content from waste-derived recycled products than clinker that has been formed without the additive. Clinker may then be cooled and ground into a fine cement powder in the cement mill. Additional additives may be introduced into the powder even after the clinker has been formed and ground.

Thus, specific embodiments and applications of introducing an additive to Portland cement manufacture have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of incorporating a mineral containing particulate into a Portland cement manufacturing process having a burning step, the method comprising:

agglomerating the mineral containing particulate and an agglomerating material to produce an additive; and introducing the additive into the Portland cement manufacturing process before the burning step.

2. The method of claim 1, wherein at least one of the mineral containing particulate and the agglomerating material is a waste product.

3. The method of claim 1, wherein both the mineral containing particulate and the agglomerating material are waste products.

4. The method of claim 1, wherein the additive has a b.t.u./lb rating of less than 5000.

5. The method of claim 1, wherein the additive has a b.t.u./lb rating of less than 8000.

6. The method of claim 1, wherein the mineral containing particulate comprises at least one of lime kiln dust, cement kiln dust, mineral extraction tailings, cracking catalyst fines, iron ore fines, fly ash, baghouse fines, and powder coating dust.

7. The method of claim 1, wherein the agglomerating material comprises at least one of a water soluble paint, a water soluble ink, a paint sludge, a paint wash water, and an adhesive.

8. The method of claim 1, wherein the step of agglomerating further comprises mixing the mineral containing particulate and the agglomerating material.

9. The method of claim 1, wherein a ratio of a weight of the agglomerating material to a weight of the mineral containing particulate is between 1:0.5 and 1:5.

10. The method of claim 1, wherein the step of introducing the additive comprises adding the additive to a raw feed of a Portland cement making process.

11. The method of claim 1, further comprising the step of drying the additive before the step of introducing.

12. The method of claim 1, wherein the burning step comprises at least one of calcining, roasting, and autoclaving.

13. The method of claim 1, wherein the burning step further comprises forming lumps of cement clinker comprised at least in part of minerals from the mineral containing particulate and a portion of the agglomerating material.

14. The method of claim 1, wherein the additive is introduced into a kiln.

15. A method of incorporating a mineral containing particulate into a Portland cement manufacturing process having a burning step, the method comprising:

agglomerating the mineral containing particulate and an agglomerating material to produce an additive, wherein the agglomerating material comprises at least one of a water soluble paint, a water soluble ink, a paint sludge, a paint wash water, and an adhesive; and introducing the additive into the Portland cement manufacturing process before the burning step.

16. A method of incorporating a mineral containing particulate into a Portland cement manufacturing process having a burning step, the method comprising:

agglomerating the mineral containing particulate and an agglomerating material to produce an additive, wherein the mineral containing particulate comprises at least one of lime kiln dust, cement kiln dust, mineral extraction tailings, cracking catalyst fines, iron ore fines, fly ash, baghouse fines, and powder coating dust, and the agglomerating material comprises at least one of a water soluble paint, a water soluble ink, a paint sludge, a paint wash water, and an adhesive; and introducing the additive into the Portland cement manufacturing process before the burning step.

* * * * *